US008700577B2

(12) United States Patent
Yeh et al.

(10) Patent No.: US 8,700,577 B2
(45) Date of Patent: Apr. 15, 2014

(54) METHOD AND SYSTEM FOR ACCELERATED DATA QUALITY ENHANCEMENT

(75) Inventors: Peter Zei-Chan Yeh, San Jose, CA (US); Colin Anil Puri, Sugar Land, TX (US)

(73) Assignee: Accenture Global Services Limited GmbH, Shauffhausen (CH)

( * ) Notice: Subject to any disclaimer, the term of this patent is extended or adjusted under 35 U.S.C. 154(b) by 486 days.

(21) Appl. No.: 12/779,830

(22) Filed: May 13, 2010

(65) Prior Publication Data

US 2011/0138312 A1 Jun. 9, 2011

Related U.S. Application Data

(60) Provisional application No. 61/267,338, filed on Dec. 7, 2009, provisional application No. 61/297,233, filed on Jan. 21, 2010.

(51) Int. Cl.
*G06F 7/00* (2006.01)
*G06F 17/30* (2006.01)

(52) U.S. Cl.
USPC .......................................................... 707/692

(58) Field of Classification Search
USPC .......................................................... 707/692
See application file for complete search history.

(56) References Cited

U.S. PATENT DOCUMENTS 7,315,825 B2   1/2008  Rosenfeld et al.
7,756,873 B2 * 7/2010  Gould et al. .................. 707/737
7,836,004 B2  11/2010  Roth et al.
2009/0006302 A1  1/2009  Fan et al.
2009/0271358 A1 10/2009  Lindahl et al.
2009/0287721 A1* 11/2009  Golab et al. .................. 707/100
2010/0138363 A1  6/2010  Batterberry et al.

OTHER PUBLICATIONS

Chiang et al., "Discovering Data Quality Rules", PVLDB '08, pp. 1166-1177, 2008, ACM.*
Ilyas et al., "CORDS: Automatic Discovery of Correlations and Soft Functional Dependencies", SIGMOD 2004, ACM, 2004.*
Yeh et al., "An Efficient and Robust Approach for Discovering Data Quality Rules", 22nd International Conference on Tools with Artificial Intelligence, pp. 248-255, IEEE, 2010.*
Fan et al., "Conditional Dependencies: A Prinicpled Approach to Improving Data Quality", BNCOD 2009, LNCS 5588, pp. 8-20, Springer-Verlag Berlin Heidelberg, 2009.*

(Continued)

*Primary Examiner* — Michael Hicks

(57) ABSTRACT

Embodiments of the present invention solve the technical problem of identifying, collecting, and managing rules that improve poor quality data on enterprise initiatives ranging from data governance to business intelligence. In a specific embodiment of the present invention, a method is provided for producing data quality rules for a data set. A set of candidate conditional functional dependencies are generated comprised of candidate seeds of attributes that are within a certain degree of relatedness in the ontology of the data set. The candidate conditional functional dependencies are then applied to the data refined until they reach a quiescent state where they have not been refined even though the data they have been applied to has been stable. The resulting refined candidate conditional functional dependencies are the data enhancement rules for the data set and other related data sets. In another specific embodiment of the present invention, a computer system for the development of data quality rules is provided having a rule repository, a data quality rules discovery engine, and a user interface.

23 Claims, 6 Drawing Sheets

(56) References Cited

OTHER PUBLICATIONS

"Discovering Conditional Functional Dependencies", Fan, et al., IEEE International Conference on Data Engineering2009 ICDE 09. 25th International Conference Piscataway, NJ, USA Mar. 9, 2009.
"Improving the Data Quality of Relational Databases using OBDA and OWL 2 QL", Oliver Cure www.webont.org/owled/2009.
"Conditional Functional Dependencies for Data Cleaning", Bohannon, et al. Data Engineering, Apr. 1, 2007.
"Data Quality Enhancement of Databases Using Ontologies and Inductive Reasoning", Nov. 25, 2007 Cure, et al.
"Rule Mining for Automatic Ontology Based Data Cleaning", Apr. 26, 2008 Stefan Bruggemann, OFF-Institute for Information Technology Escherweg 2, 26121 Oldenburg, Germany.

* cited by examiner

METHOD AND SYSTEM FOR ACCELERATED DATA QUALITY ENHANCEMENT

CLAIM OF PRIORITY

This application claims priority to the provisional application entitled, "Method and System for Accelerated Data Quality Enhancement," filed Dec. 7, 2009, Application No. 61/267,338. This application also claims priority to the provisional application entitled, "Discovering Conditional Functional Dependencies to Detect Data Inconsistencies," filed Jan. 21, 2010, Application No. 61/297,233.

FIELD OF THE INVENTION

The invention relates generally to automated data cleansing, and more specifically to automated data quality enhancement through the application of conditional functional dependencies.

BACKGROUND OF THE INVENTION

Modern society is characterized by an increasing reliance on the accuracy of a rapidly expanding storehouse of data. The IDC determined that the amount of data produced worldwide in 2007 was 281 exabytes, representing a 56% year-over-year increase from 2006. At the same time, the accuracy of this data is of increasing importance for the functioning of modern enterprises. Recently, the United States Government was embarrassed when a publicly accessible database indicated that several grants of money from a recovery program were distributed to Congressional Districts that did not exist. Aside from causing embarrassment and confusion, poor data quality can cause serious economic harm. Data can become corrupted due to human error as it is entered into a system by hand, or as it is taken up by human designed sensors. Since human error is unavoidable, so is the potential corruption of the data that society relies upon.

Given the increasing amount of data that large organizations are forced to deal with, several companies provide products and services that help to screen large databases for errors and correct them. Such companies are generally called data quality vendors and the service they provide of screening and correcting databases is called data quality enhancement. Data quality enhancement is generally an automated process, wherein a computer screens through all of the data in an electronic storage database and automatically flags or deletes data values that appear to be erroneous.

The critical task in data quality enhancement is the identification of rules that validate, cleanse, and govern poor quality data. To use the example of the government relief program mentioned above, a sufficient rule would be that any entry for a district where money is being spent should also appear in a list of all the congressional districts in the United States. Data quality rules can be identified using either manual or automated development. Manual development involves a data or business analyst leveraging the input of a subject matter expert (SME), or utilizing a data profiling tool.

SMEs are persons that understand the characteristics of data sets that encompass information within their field of expertise. For example, a data analyst may leverage a SME in the utilities field to learn that meters have serial numbers that are usually recorded incorrectly, and are connected to transformers with serial numbers that are related to the serial numbers of the meters. The analyst would then be able to take in this information and create a data quality rule that screened for serial numbers in a data set that did not fit the pattern described.

Data profiling tools are computer programs that examine data of interest to report statistics such as frequency of a value, percentage of overlap between two columns, and other relationships and values inherent in the data. Examples of data profiling tools include TS Discovery, Informatica IDE/IDQ, and Oracle Data Integrator. The information gleaned from a data profiling tool can indicate potential quality problems. Analysts use the information they obtain from the use of a data profiling tool to manually create rules that can enhance the quality of the examined data.

Some profilers, such as Informatica Data Explorer, can automatically infer basic data quality rules on their own. For example, they can set a rule for which columns cannot have null values. However, this is a particularly simple data quality rule. Null value entries are the easiest type of error to detect because they are clearly indicative of a data entry oversight and they do not have values equivalent to any possible correct entry. Other profilers, such as TS Discovery, Informatica Data Quality, provide out-of-the-box rules for name and address validation. These rules are also somewhat rudimentary because addresses are characteristically regimented, are a quintessential element for large commercial databases, and follow tight patterns. Available data profilers do not contain rules that target more complex, or more client-specific quality problems.

Both forms of obtaining information for the manual development of data quality rules have their drawbacks. Modern data profiling tools are extremely powerful and can present an analyst with a mountain of data characteristics and inter-relationships within a dataset. However, the creation of actionable data quality rules will still require the time consuming and non-trivial process of interpreting and applying the acquired statistics. Acquiring information from an SME can also be time consuming and difficult given that the information must often be gleaned through a personal interview which requires man hours from both the analyst and the SME. For obvious reasons, it is also time consuming for an analyst to short circuit interactions with an SME and attempt to become proficient in the data bases of a given area on their own.

Automated rule development methodologies have been described in the academic literature. Such methods include most prominently mining data to form association rules and mining data for conditional functional dependencies (CFDs). There is a general consensus in the field that association rules are inadequate for addressing data quality problems in large databases. The process of mining data for CFDs is emerging as a more promising approach to automated data enhancement.

CFDs are rules that enforce patterns of semantically related constants. FIG. 1 provides an example of a simple CFD. In this case, the input data points 101 and 102 have three attributes which are a country code (CC), a state (S), and an area code (AC). A data set made up of such data points could be part of a database keeping track of the locations of an enterprise's customers. CFD 100 checks data based on the fact that if a country code is 01 for the United States, and an area code is 408, then the accompanying state should be California. Applying data input 101 to CFD 100 will result in a passing output value 103. Whereas applying data input 102 to CFD 100 will result in a failing output value 104.

There are two main drawbacks to the approach of automating the discovery of CFDs. The first is that the number of CFDs that could possibly be applied to a data set increases exponentially with an increase in the number of attributes in the data set. This results in a nearly prohibitive increase in the complexity of such a method. In the example above, with a relatively simple set of three values there could still be 12 functional dependencies. The number of possible CFDs would greatly exceed that number multiplied by the more that 270 area codes in service in the United States. Current automated discovery methods are also unable to handle noisy data.

SUMMARY OF INVENTION

In one embodiment of the invention a computer-implemented method for producing data quality rules for a data set is provided. In a first step, a set of candidate conditional functional dependencies based on a set of candidate seeds by using an ontology of said data set is generated. Each of the candidate seeds are comprised of a subset of attributes drawn from a set of all the attributes of said data set that have a predetermined degree of separation in said ontology. In a second step, the candidate conditional functional dependencies are applied individually to the data set to obtain a set of corresponding result values for each of the candidate conditional functional dependencies. In a third step, the candidate conditional functional dependencies are refined and are reapplied individually to the data if their corresponding set of result values do not form a result signature that meets a predetermined expectation. In a fourth step, the applying and refining terminates when all of the candidate conditional functional dependencies reach a quiescent state. In a final step, a relevant set of said candidate conditional functional dependencies are selected to be used as said data quality rules for said data set.

DETAILED DESCRIPTION OF THE PREFERRED EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers such modifications and variations as come within the scope of the appended claims and their equivalents.

Embodiments of the present invention solve the technical problem of identifying, collecting, and managing rules that improve poor quality data on enterprise initiatives ranging from data governance to business intelligence. Embodiments of the present invention also significantly reduce the amount of manual effort required to collect data quality rules on enterprise initiatives such as master data management, business intelligence, and others. Moreover, embodiments of the present invention also supports other business needs such as ensuring that one's data conforms to predefined business logic.

Embodiments of the present invention solve the problems described above by automatically discovering actionable data quality rules and by providing an intuitive rule browser to manage these rules. Embodiments of the present invention do not suffer from the computational complexity of prior art methods and are capable of dealing with noisy data. Finally, embodiments of the present invention are able to provide data quality enhancement rules to specific client data cleanliness issues without the need for costly access to, and assimilation of SME knowledge of data characteristics.

Figure 1:
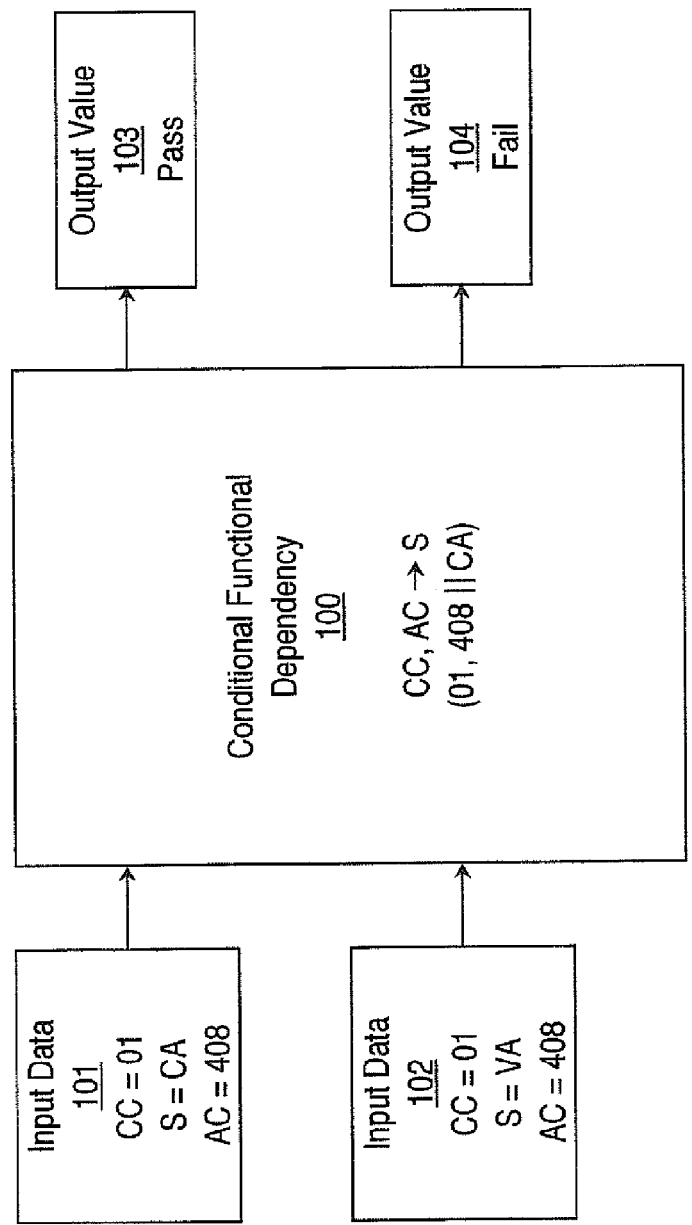
FIG. 1 illustrates a conditional functional dependency operating on input data.
Figure 2:
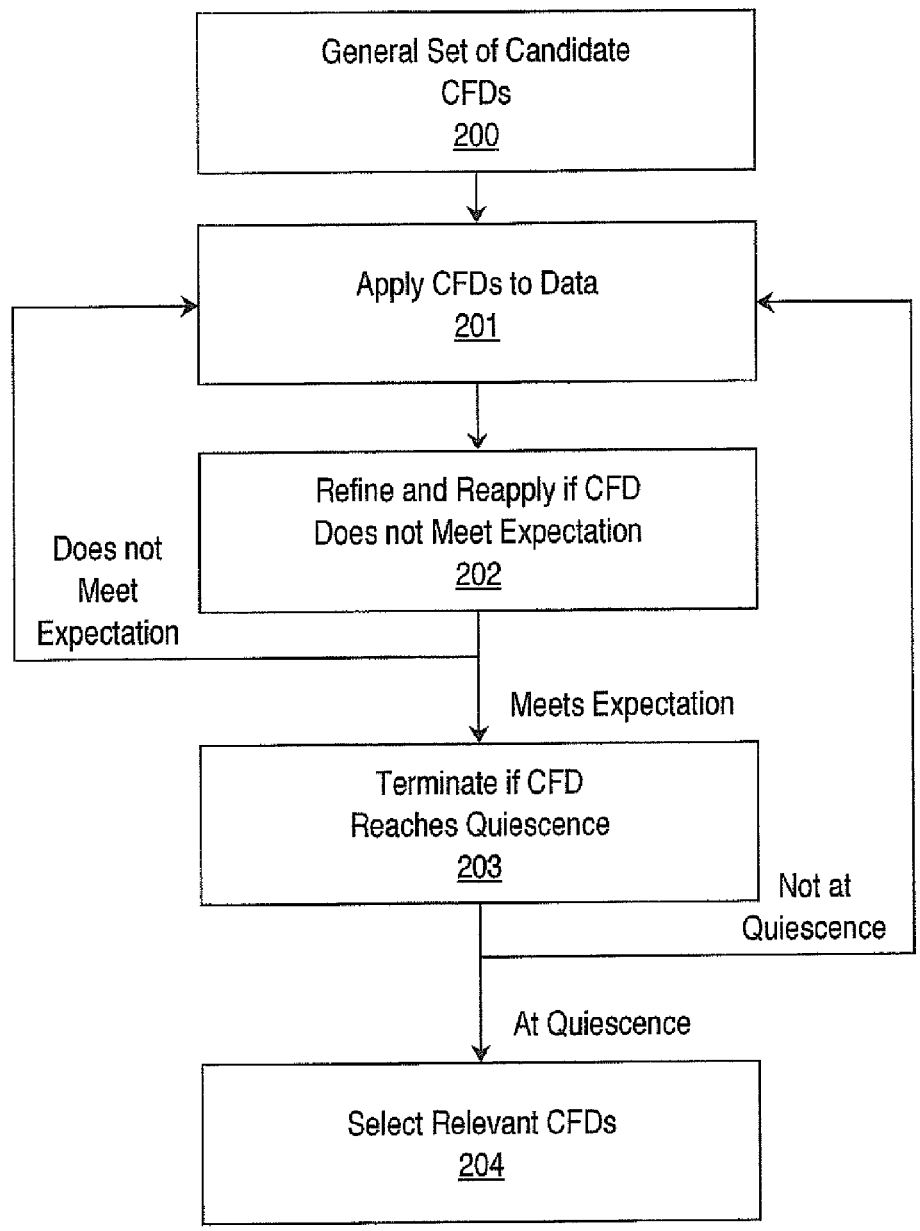
FIG. 2 illustrates a method for producing data quality rules for a data set that is in accordance with the present invention.

FIG. 2 displays a method for producing data quality rules for a data set that is in accordance with the present invention. Before the method begins, it is assumed that an ontology of the data set is available which indicates which attributes in the data set are related. To use the previously discussed example, area code and state would be directly related, whereas a different variable such as a customer's first name may not be related to area code at all. In step 200, a set of candidate CFDs is generated. The candidate CFDs are based on a set of candidate seeds that are subsets of all the attributes in the data set. In keeping with the previous example, a candidate seed could be a combination of the country code and the area code. The attributes selected for the candidate seeds would have a certain degree of separation in the ontology of the data set. For example, attributes that are within three links in the ontology could be selected as groups of attributes for the candidate seeds.

In specific embodiments of the present invention, the number of candidate CFDs, the number of conditions in each CFD, and the number of attributes in each CFD is determined by a user prior to beginning to practice the invention. The number of conditions in a CFD determines how many constraints are placed on the attributes that form the CFD. In keeping with our example, the rule "if area code is 408; then state must be California" would count as a single condition. All three of these variables would have a direct impact on the time it would take for the automated portion of the method to execute. Selecting a lower number for any of these values would trade-off the overall efficiency of the resultant set of data enhancement rules for a faster convergence of the candidate CFDs.

In step 201, the candidate CFDs would be applied individually to data in the data set. In a specific embodiment of the invention, this applying would be done in data segments having a predetermined length. For example, the CFDs could be applied to a data segment having a length of one-thousand data points. Embodiments that took this approach would save a significant amount of time because it would take less time to apply the rules to a data segment as compared to the entire data set.

In a specific embodiment of the invention, the size of the data segment would be set by a scan period that was determined by a user. The purpose of applying the CFDs to the data would be to obtain a set of corresponding result values for each of the CFDs. The set of corresponding result values would generally be equivalent in size to the number of data points said CFDs were applied to. In another specific embodiment of the present invention, the set of result values would indicate if the rule matched the data point, if the rule did not match but did not conflict with the data point, and if the rule conflicted with the data point.

In step 202, the candidate CFDs are refined individually if they have a result signature that does not meet a predetermined expectation. In a specific embodiment, the result signature would be a list of the result values that came about from applying the individual CFDs to the data. The refining of the individual candidate CFDs would be done such that they would more closely meet the predetermined expectation if reapplied to the data.

In a specific embodiment of the present invention, the refining could be achieved through the elimination of a high entropy attribute from the candidate CFD. The highest entropy attribute would be the attribute in the candidate CFD that took on the most values throughout the data set. Selecting this attribute for elimination would be effective in refining the candidate CFD because it would statistically be the best attribute to eliminate in order to make the candidate CFD less restrictive. In the example discussed above with three attributes, this would most likely result in the elimination of the area code attribute in any candidate CFD that did not meet the predetermined expectation.

In a specific embodiment of the invention, the predetermined expectation would be set by a coverage estimate and a predetermined error estimate. The coverage estimate would be an estimate of how many different data points the candidate CFD would apply to, meaning that the attributes and values on which the candidate CFD operated on were present in the data point. For example, a candidate CFD with the condition "if area code is 408; then state must be California" would cover any data point where the area code attribute was 408. The error estimate would be an estimate of how many different data points would fail a candidate CFD that expressed a desired relationship in the data. For example, an SME might provide the information that 5% of the area codes in a database were probably incorrect, and that such errors were random. In that case, the error estimate would be 5%, and a data point with an area code of 408 and a state besides California would count as one data point towards the total error content of the result signature. If there were five errors in a result signature for a one-hundred data point data segment, then the error estimate would match exactly. Embodiments that utilize error estimates will be able to handle noisy data because they take account of potential errors. Without taking an error estimate into account, a result value that indicated the rule didn't fit would not carry any information regarding whether the rule was erroneous. In another specific embodiment of the invention, the coverage estimate and error estimate could be adjusted by a user.

In step 203, the applying and refining of the candidate CFDs terminates when the candidate CFD has reached a quiescent state. The benefit of such an approach is that unnecessary processing is prevented because rules that have been proven valid are not continuously applied. In addition, not all of the data in a finite data set needs to be examined, only enough to formulate stable rules. In a specific embodiment of the invention, a quiescent state is defined as the point when a candidate CFD has been applied without refinement to a series of data points that contain stable data. Data stability can be determined either by reference to the swing of the values of particular attributes relative to a known variance, or it could be set by tolerances obtained from a SME. The number of data points in the aforementioned series could be set by a window period value, and in another specific embodiment of the invention the window period could be adjusted by a user. Since this window period and the data segments in step 201 are of different sizes, there may be a lag time between when step 202 produces a meets-expectation-result, and when step 203 executes and determines if a CFD under test has reached quiescence.

In specific embodiments of the present invention, different candidate CFDs could be at different places within FIG. 2. Some candidate CFDs could reach quiescence rapidly and be ready to move on to step 204, while others are still circling back through step 201. As mentioned before, this approach would save precious computing time because CFDs that had already converged would not be reapplied to the data.

In step 204, a relevant set of said candidate CFDs is selected. The relevant set of candidate CFDs will be the data quality rules for the data set. Relevance is determined mainly by the level of coverage of any specific candidate CFD. Coverage, was described above, and refers to how many data points a candidate CFD applies to. In a specific embodiment of the invention, relevance would also be set by a goodness of fit statistical analysis of the stable candidate CFDs. The goodness of fit analysis for relevance would include a detected error rate and a degree of coverage for the CFDs. The most relevant CFDs under the goodness of fit analysis would be those with the highest level of coverage, and a minimum proximity between their detected error rates and the estimated error rate.

In a specific embodiment of the present invention, the data quality rules could be sorted automatically. This would be important because in many complex situations the number of stable candidate CFDs would be very high and their analysis would be time consuming. For example, the candidate CFDs in the relevant set could be ranked according to an interestingness factor. The ranking would be done so that a person evaluation the relevant CFDs would be aided in directing their attention. The interestingness factor would increase as the portion of a data set containing one of the values on which the candidate CFD was based decreased. Using the example discussed above, if there were a thousand data points with the value 408 for the area code attribute in a data set, and 4 data points with the value 212 for the area code in the data set, then a candidate CFD which was based on the area code equaling 212 would have a higher value for the interestingness factor. In another specific embodiment of the present invention, the data quality rules could be grouped together into subsets of rules that addressed similar data quality problems. In a still further embodiment statistics such as connections between rules, conflicts between rules, and percentage of data covered by each rule could be provided along with the rules.

In another embodiment of the present invention, a method for enhancing data quality is provided. The method would proceed in much the same way as described in reference to FIG. 2. However, the relevant set of candidate CFDs produced by the process would be applied to enhance the data quality of a data set. The candidate CFDs, which at this point would be the data enhancement rules, would be applied to all of the data in the data set. Data points that did not align with the data enhancement rules would either be flagged for later attention or could be deleted or modified to a best guess of their proper value, thereby enhancing the data quality of the data set.

The data enhancement rules generated in accordance with the present invention could also be applied in embodiments of the present invention to enhance the data quality of a related group of data sets. The rules could be applied to any number of data sets with similar content, meaning that the data in the related data sets had a characteristic similar to that of the original data set on which the method determined the data quality rules. This process could be adapted for data sets that were stored externally by exporting the relevant rules to a data quality product or an external database management system. In particular, the data quality products to which the rules could be exported could be TS Discovery, Informatica IDE/IDQ and Oracle Data Integrator.

Figure 3:
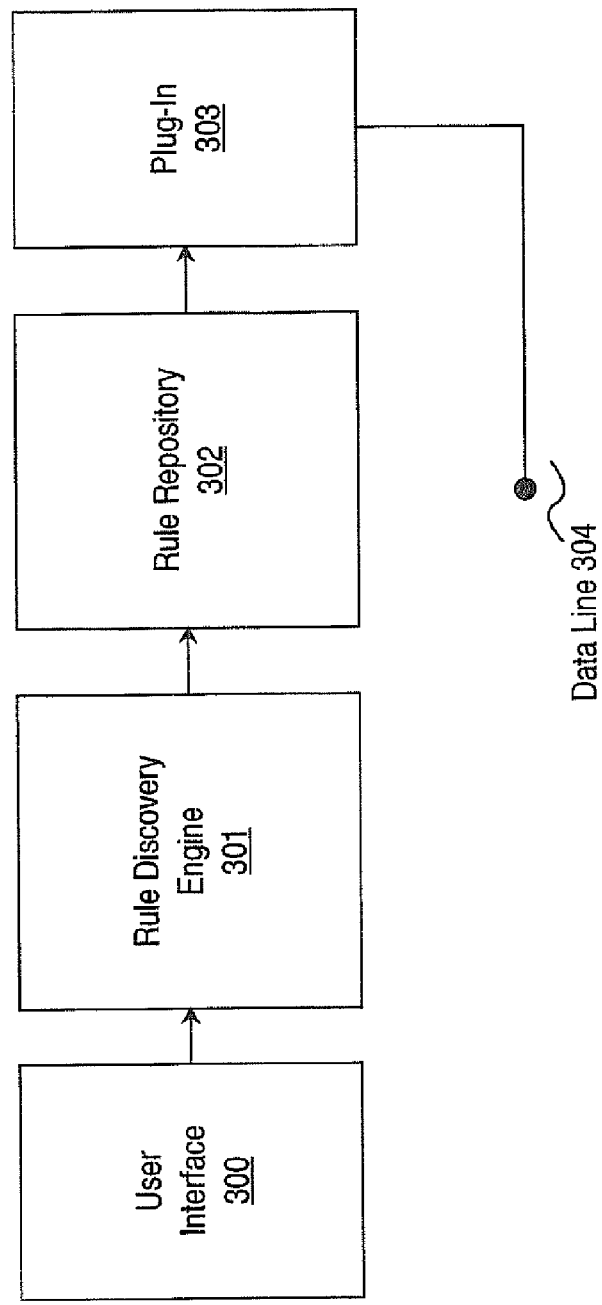
FIG. 3 illustrates a system for producing data quality rules for a data set that is in accordance with the present invention.

FIG. 3 displays a computer system for the development of data quality rules that is in accordance with the present invention. Rule repository 302 is used for storing data quality rules. In a specific embodiment of the invention, rule repository 302 is capable of delivering the rules to a plug in data-exchanger such as plug-in 303. Plug-in 303 can be added to the system which allows exporting the data rules to another system in a compatible fashion. In a preferred embodiment, plug-in 303 would be comprised of a set of plug-ins that each assured compatability with a different external system. Such an embodiment would be desirable because the rules can then be adapted to be applied to any number of external systems along data line 304. The external systems capable of receiving the data quality rules could be a system running a data quality product, an external data base management system, or any other system to which data quality rules may be applied. In particular, the external system could be one running a data quality product such as TS Discovery, Informatica IDE/IDQ and Oracle Data Integrator.

Rule repository 302 obtains the data quality rules from data quality rules discovery engine 301. The data quality rules discovery engine 301 is capable of receiving a data set, an ontology of the data set, and a set of rule generation parameters from user interface 300. User interface 300 is also capable of outputting the data quality rules that are discovered by data quality rules discovery engine 301 for external use. Data quality rules discovery engine 301 forms a set of candidate CFDs based on the ontology of the data set and refines those rules iteratively based on observation of how the rules function when applied to the data. Data quality rules discovery engine 301 terminates the iterative refining process when the candidate CFDs reach a quiescent state and become data quality rules.

In a specific embodiment, a user interface, such as user interface 300, could further comprise a graphical user interface (GUI). In a specific embodiment of the present invention, such a GUI could be capable of receiving rule generation parameters, an address of a data set, an address of related data sets, and an address of an ontology from a user. The rule generation parameters could also be adjusted by a user through the use of the GUI. Finally, the GUI could also be capable of displaying the rules that were generated by the rule discovery engine to the user such that the user could double check and optionally revise the displayed rules. The rules could also be displayed by the GUI with information regarding the rules such as the portion of the data that the rule applied to and the detected error rate of the data when applied to the rule.

Figure 4:
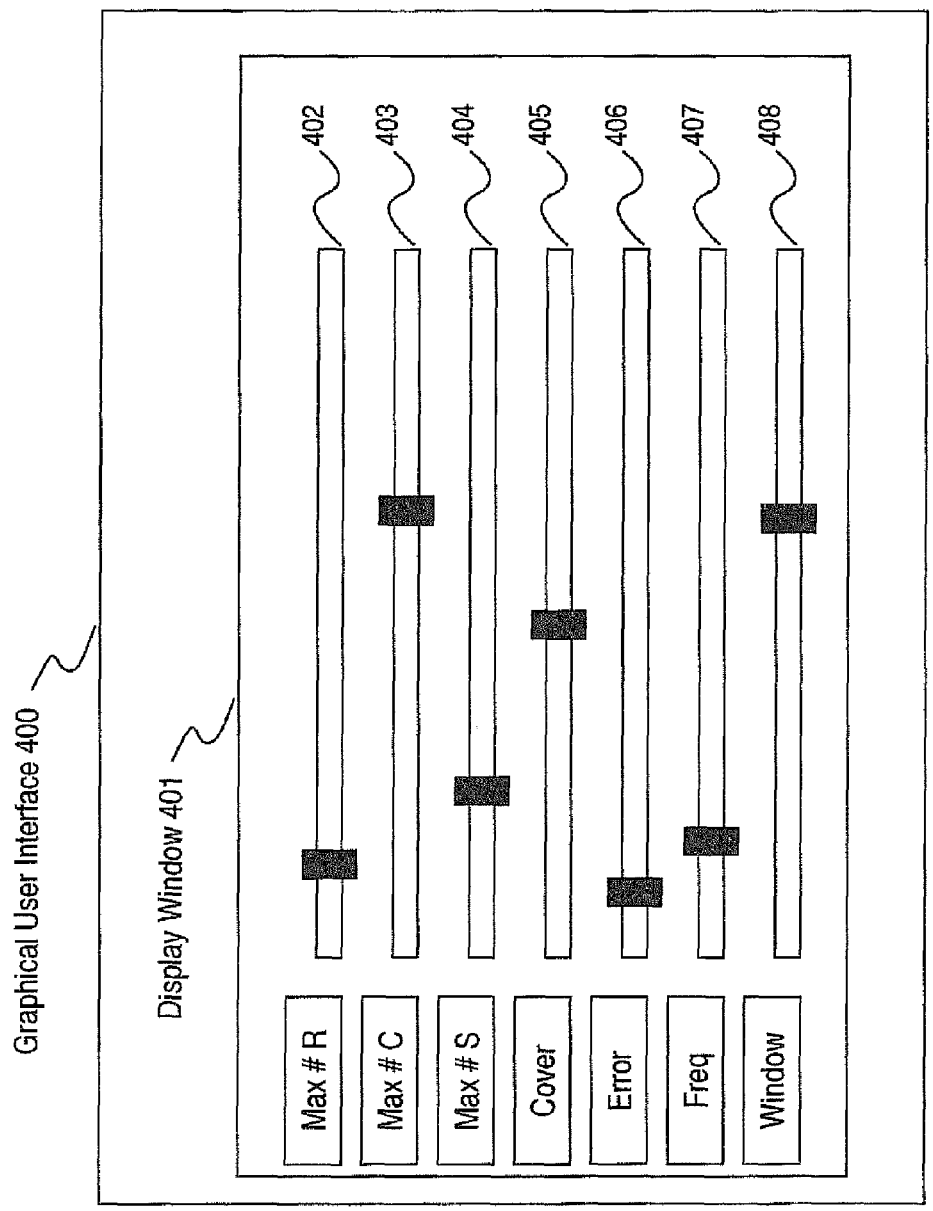
FIG. 4 illustrates a graphical user interface data input that is in accordance with the present invention.

FIG. 4 displays an example of an input display of a GUI in accordance with the present invention. GUI 400 is capable of displaying information to and receiving information from a user. Display window 401 contains several selectors. In a specific embodiment the selectors could include a max number-of-rules selector 402 capable of accepting and setting the number of candidate CFDs, a max number of conditions selector 403 capable of accepting and setting the maximum number of conditions in each of the candidate CFDs, a max number of seeds selector 404 capable of accepting and setting the maximum number of candidate seeds in each of the candidate CFDs, a coverage selector 405 capable of accepting and setting the desired coverage of any particular CFD as applied to the data set, an error rate selector 406 capable of accepting and setting the expected error rate of any particular CFD as applied to the data set, a frequency selector 407 capable of accepting and setting the scan period for each application of any particular CFD to the data set, and a window size selector 408 capable of accepting and setting the amount of data that needs to be evaluated before the rules will be evaluated for quiescence. Values selected by the selectors can be submitted to data quality rules discovery engine 301.

Figure 5:
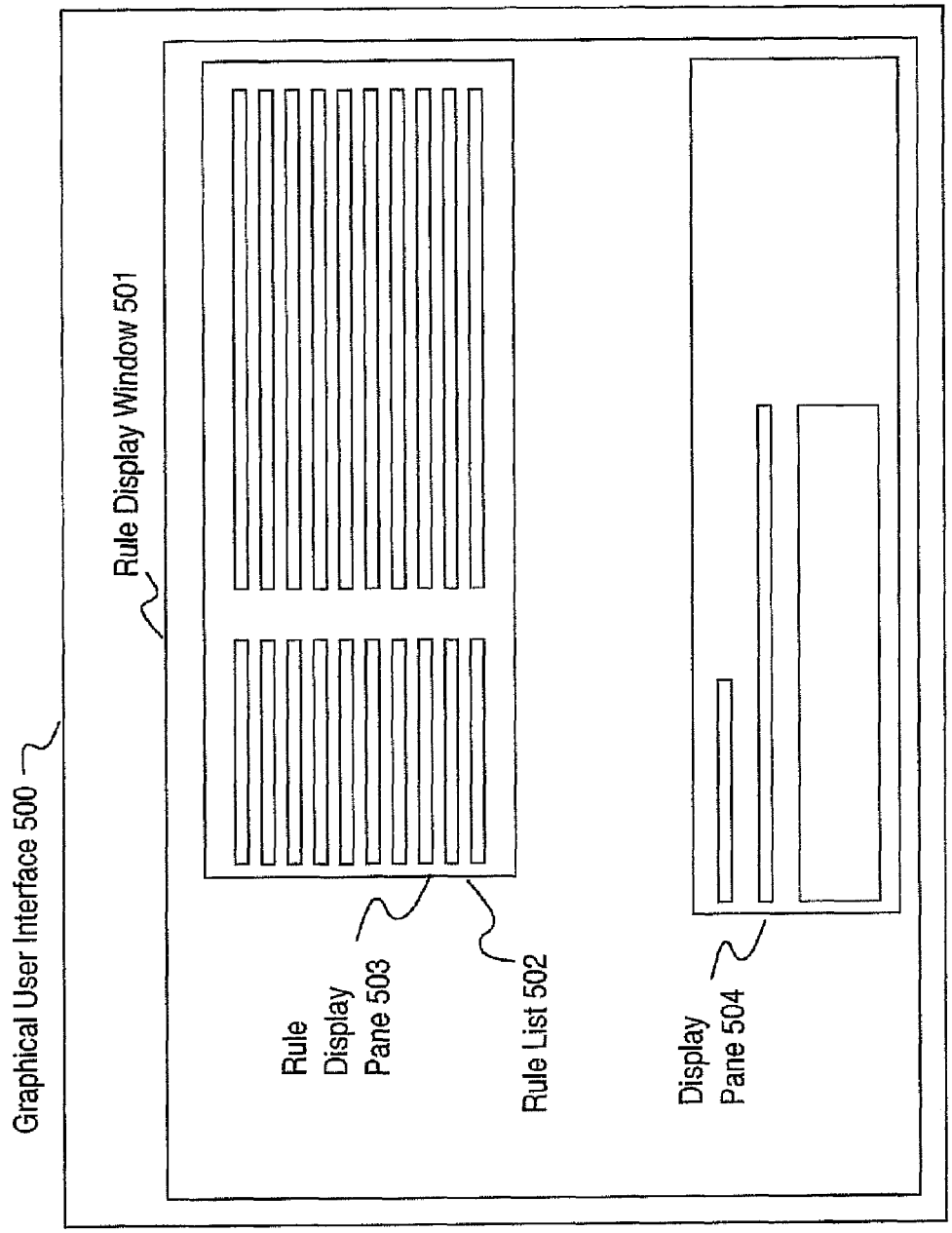
FIG. 5 illustrates a graphical user interface rule display that is in accordance with the present invention.

FIG. 5 displays an example of an output display of a GUI in accordance with the present invention. GUI 500 is capable of displaying information to and receiving information from a user. Display window 501 is capable of enabling both business and technical users to understand, modify, and manage discovered rules by reporting key information such as connections between rules, conflicts between rules, and percentage of data covered by each rule. Rule display pane 503 is capable of displaying a summary of each rule as well as important statistics of the rule. Rule list 502 is capable of displaying the rules in an organized and modifiable format with a summary of the statistics of each rule displayed alongside. Details pane 504 is capable of displaying more in-depth information regarding a selected rule.

An approach that addresses the limitations of requiring FDs as inputs and of difficulty scaling to relations with a large number of attributes is described below. This approach can: effectively prune the search space and hence can handle relations with a large number of attributes (e.g. up to 100), robustly handle dirty data during discovery and hence can discover useful CFDs even when the data has a large percentage of inconsistencies (e.g. up to 50%), and determine when a rule becomes stable and hence can avoid examining the entire data set and over fitting.

In one embodiment, the approach may be called "CFinder." In one embodiment, CFinder discovers CFDs from a relation of interest through the following steps. CFinder first generates an initial set of candidate CFDs. CFinder then refines each CFD by removing extraneous (or invalid) conditions, and stops refining a CFD when it becomes stable. Finally, CFinder filters weak (and subsumed) CFDs, and generalizes the remaining ones to increase their applicability.

In one embodiment, given a relation R, CFinder generates candidate CFDs (i.e. rules of the form (X→Y, Tp) where X and Y are attributes from R, and Tp is a pattern tuple which consists of values from these attributes).

In one embodiment, CFinder first generates all attribute combinations of size N+1 from R where N is the maximum number of attributes (and hence conditions) allowed in the antecedent X of a CFD. CFinder imposes this restriction because CFDs with a large number of conditions in the antecedent have limited applicability in practice.

CFinder then generates candidate CFDs from each combination. For each attribute in a combination, CFinder turns that attribute into the consequent (i.e. Y) of a CFD and turns the remaining attributes into the antecedent (i.e. X). CFinder then instantiates the pattern tuple with respective values from these attributes whose frequency exceeds the minimum support threshold. For example, given Table 1, a sample of records and attributes from U.S. Federal grants received by Michigan:

TABLE 1

| # | Rcpt Category | Rcpt City | Rcpt District | Agency | Agency Code | Program | CFDA No. |
|---|---|---|---|---|---|---|---|
| 1 | Government | Lansing | 6 | ED | 9131:DOED | Pell | 84.063 |
| 2 | Government | Lansing | 8 | FHA | 6925:DOT | Highway Planning | 20.205 |
| 3 | Government | Lansing | 8 | FHA | 6925:DOT | Highway Planning | 20.205 |
| 4 | For Profit | Lansing | 8 | HUD | 8630:HUD | Pell | 14.885 |
| 5 |  | Ann Arbor | 15 | ED | 9131:DOED | Work Study | 84.063 |
| 6 | Higher ED | Ann Arbor | 15 | ED | 9131:DOED | Section 8 Housing | 84.033 |
| 7 | For Profit | Detroit | 13 | HUD | 8630:HUD | Section 8 Housing | 14.317 |
| 8 | For Profit | Detroit | 13 | HUD | 8630:HUD | Section 8 Housing | 14.317 | and given a minimum support of 20% and the following attribute combination from Table 1:
(Agency, Agency Code, Program, CFDA No.)
some of the CFDs that CFinder will generate include:
(Agency Code, Program, CFDA No.→Agency, (9131:DOED, Pell, 84.063||ED))
(Agency, Agency Code, Program→CFDA No., (HUD, 8630: HUD, Pell||14.317))

In one embodiment, when the number of combinations (and hence candidate CFDs) is extremely large, CFinder prunes combinations that are unlikely to produce useful CFDs based on two heuristics.

Figure 6:
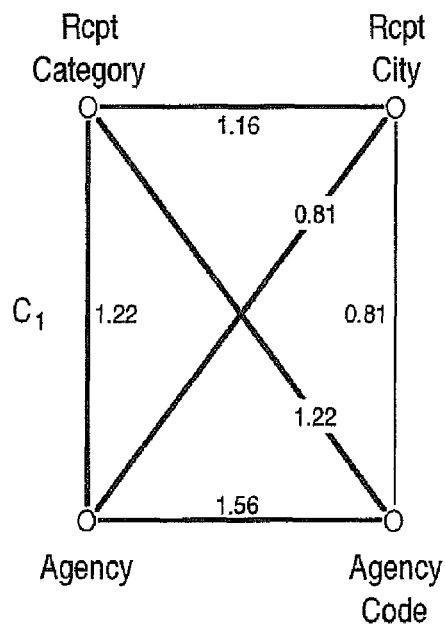
FIG. 6 shows a fully connected graph for an example of an attribute combination in accordance with the present invention.
Figure 6:
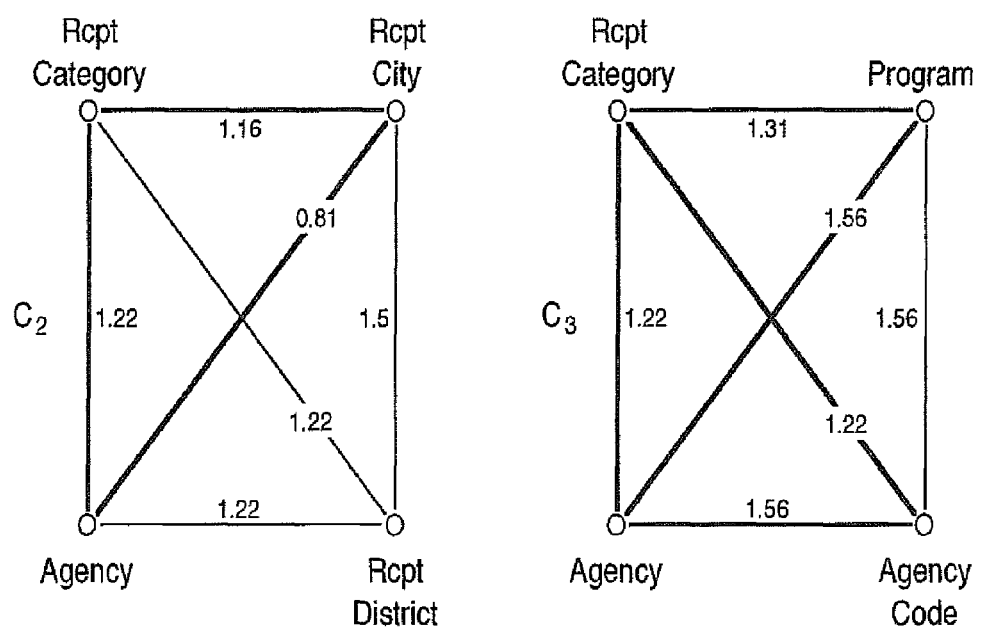

The first heuristic is useful CFDs are more likely to be generated from attributes that are strongly related (e.g. Agency and Agency Code). In one embodiment, CFinder implements this heuristic by treating each combination as a fully connected graph with attributes as nodes and by computing the average strength across all edges (and hence how strongly are the attributes related to each other) using the following equation:

$$\frac{\Sigma_{(A,B) \in E(c)} \text{Strength}(A, B)}{|E(c)|}$$

where $E(c)$ are all edges in the attribute combination c, $(A, B)$ is an edge between attributes A and B, and Strength $(A, B)$ measures how strongly A is related to B. A good measure for Strength(A, B) can be the semantic relationships provided by an ontology when available. If an ontology is not available, then metrics such as the mutual dependence between these attributes can provide an alternative measure for Strength(A, B), as high mutual dependence indicates a strong relationship between A and B. Hence, in one embodiment, CFinder defines Strength(A, B) as the mutual information shared between A and B:

$$\sum_{a \in U(A)} \sum_{b \in U(B)} P(a, b) \log \frac{P(a, b)}{P(a) P(b)}$$

where $U(A)$ and $U(B)$ are the unique values in A and B respectively; and P is the relative frequency of a value (or value pair) in an attribute (or attribute pair). In one embodiment, CFinder prunes combinations with low strength, and sets the default strength threshold to 0.5. For example, FIG. 6 shows the fully connected graph for the following attribute combination from Table 1.

$c_1$: (Rcpt Category, Rcpt City, Agency, Agency Code)
The edge labels indicate the strength between these attributes. Since the average strength (i.e. 1.13) is greater than 0.5, in one embodiment, CFinder will keep this combination.

The second heuristic is many combinations are variants of one another and can be pruned. These variants often result in the discovery of the same CFDs because in one embodiment, CFinder refines CFDs by removing extraneous and/or invalid conditions from the antecedent.

In one embodiment, CFinder implements this heuristic by first sorting, in descending order based on strength, combinations that remain after applying the first heuristic. In one embodiment, CFinder then traverse this list in descending order, and for each combination c it finds all preceding combinations C' that have minimal difference with c. In one embodiment, CFinder defines this difference as the number of attributes in c that are not in c' where c'∈C', and sets the default difference to 1 (i.e. C' will contain all combinations that differ from c by one attribute).

Since C' contains more promising combinations, and hence CFDs, than c, in one embodiment, CFinder should prune c if it has significant overlap with C'. Because each combination can be treated as a fully connected graph, the overlap between c and any combination in C' is their maximum common subgraph. If the non-overlapping edges in c (i.e. edges not found in C') are weak, then it is unlikely that this combination will produce any new, useful CFDs. In one embodiment, CFinder captures this notion formally as:

$$\frac{\Sigma_{(A',B') \in E'(c)} \text{Strength}(A', B')}{\Sigma_{(A,B) \in E(c)} \text{Strength}(A, B)}$$

where $E(c)$ are all edges in c and $E'(c)$ are edges in c that overlap with combinations in C'. If this value exceeds the prune threshold HP, then the combination is pruned.

For example, FIG. 6 shows two additional combinations from Table 1 whose strengths rank higher than $c_1$. If HP is 0.85, then, in one embodiment, CFinder will prune $c_1$ because it has high overlap (shown in bold) with $c_2$ and $c_3$, and the nonoverlapping edge in $c_1$ is weak.

In one embodiment, CFinder generates candidate CFDs from the remaining combinations. In one embodiment, CFinder starts with the strongest one and refines these CFDs in the order they are generated.

In one embodiment, CFinder refines each candidate CFD by comparing it with records from the relation of interest. In one embodiment, CFinder randomizes the order in which records are examined. In one embodiment, for each record, CFinder determines whether the record is consistent, inconsistent, or irrelevant to the CFD.

A record is consistent with a CFD if all values in the pattern tuple of the CFD match the respective values in the record. If so, then, in one embodiment, CFinder increments the consistent record count $R_C$ by 1.

A record is inconsistent with a CFD if all values in the pattern tuple that correspond to the antecedent of the CFD match the respective values in the record, but values that correspond to the consequent do not. If so, then, in one embodiment, CFinder increments the inconsistent record count $R_I$ by 1.

Otherwise, the record is irrelevant to the CFD, and, in one embodiment, CFinder increments the irrelevant record count $R_V$ by 1. In one embodiment, CFinder uses these counts to check whether the CFD is too specific (and hence needs to be refined) and whether inconsistencies encountered for the CFD are real errors in the data or anomalies, which can be ignored. In one embodiment, CFinder performs this check once every M records using the minimum support threshold $H_S$—i.e. $R_C/(R_C+R_V) \geq H_S$—and the maximum inconsistency threshold $H_I$—i.e. $R_I/(R_I+R_C) \leq H_I$.

If a CFD fails to meet the minimum support threshold $H_S$, then, in one embodiment, CFinder refines the CFD by removing extraneous and/or invalid conditions from its antecedent. However, the difference between the observed support (i.e. $R_C/(R_C+R_V)$) and the expected support (i.e. $H_S$) may be due to "sampling" effect with the M records examined. This effect can cause the CFD to be over-refined and become too promiscuous. Hence, in one embodiment, CFinder needs to determine the significance of this difference, and it uses the $X^2$ test (or similar test such as the G-test), which is instantiated as:

$$\frac{(R_C - H_S(R_C + R_V))^2}{H_S(R_C \mid R_V)} + \frac{(R_V - (1 - H_S)(R_C + R_V)^2}{(1 - H_S)(R_C \mid R_V)}$$

In one embodiment, CFinder will refine a CFD only if the difference is significant. The difference is significant if the resulting $X^2$ value exceeds the critical $X^2$ value at specified confidence level, which CFinder defaults to 99%. In one embodiment, CFinder selects the top K most promising conditions to remove from the antecedent of the CFD. Since the goal is to improve support, in one embodiment, CFinder should remove conditions whose value occurs infrequently and whose corresponding attribute has high uncertainty (i.e. contains many different values) because these conditions cause many records to be irrelevant. In one embodiment, CFinder implements this notion formally as:

$(1-P(T_p(A), T_p(B)))$ Entropy$(A,B)$ where A and B are attributes of the condition and consequent respectively; $T_p(*)$ is the value of an attribute in the pattern tuple; P is the relative frequency of the value pair $T_p(A)$ and $T_p(B)$ across all records examined so far; and Entropy$(A,B)$ is the joint entropy between A and B across all records examined so far.

In one embodiment, CFinder selects K conditions with the highest scores based on the equation above, and for each condition CFinder removes the condition from the antecedent of the original CFD to generate a new CFD. For example, assuming CFinder needs to refine the following CFD by selecting the top two conditions, and the records in Table 1 are the ones examined so far.

(Agency Code, Program, CFDA No.→Agency, (9131:DOED, Pell, 84.063∥ED))

In one embodiment, CFinder will select Program and CFDA No.—whose scores are 1.97 and 1.69 respectively (Agency Code has the lowest score of 0.98)—and remove them from the original CFD to generate the following new CFDs.

(Agency Code, CFDA No.→Agency, (9131:DOED, 86.063∥ED))

(Agency Code, Program→Agency, (9131:DOED. Pel1∥ED))

For each new CFD, in one embodiment, CFinder records the CFD to prevent it from being generated again; and recomputes $R_C$, $R_I$, and $R_V$ for the CFD. If no conditions remain in the antecedent, then the CFD is discarded.

Similarly, if a CFD exceeds the maximum inconsistency threshold $H_I$, then, in one embodiment, CFinder determines whether the difference between the observed inconsistency (i.e. $R_I/(R_I+R_C)$) and the expected inconsistency (i.e. $H_I$) is significant using the $X^2$ test (or similar test such as the G-test), which is instantiated as:

$$\frac{(R_I - H_I(R_C + R_I))^2}{H_I(R_C + R_I)} + \frac{(R_C - (1 - H_I)(R_C + R_I))^2}{(1 - H_I)(R_C + R_I)}$$

If the difference is significant, then in one embodiment, CFinder penalizes the CFD by adding $R_I$ to $R_V$ and then resetting $R_I$ to 0. This penalty increases the likelihood that the CFD will fail to meet the minimum support threshold, which will cause the CFD to be refined and eventually discarded (if the inconsistencies persist).

In one embodiment, CFinder repeats the above process until all records have been examined or the CFD becomes stable.

Examining all records to discover CFDs is computationally expensive and can result in CFDs that overfit the data. In one embodiment, CFinder addresses these two issues by determining whether a CFD is stable and hence does not need to be refined further. A CFD is stable if both the support for the CFD and the certainty of the values that make up the attributes referenced in the CFD are constant over a given period of time. In one embodiment, CFinder captures this notion by first computing a stability score St for the CFD using the following equation:

$$\frac{R_C}{R_C + R_V} \sum_{A \in X \cup Y} \text{Entropy}(A)$$

Where $R_C$ and $R_V$ are consistent and irrelevant record counts for the CFD respectively (see previous section); $X \cup Y$ are all attributes referenced in the CFD; and Entropy$(A)$ is the entropy of A across all records examined so far. In one embodiment, CFinder computes this score once every M records—when it checks the minimum support and maximum inconsistency thresholds.

In one embodiment, CFinder then computes the standard deviation $SD_{ST}$ for the past L stability scores; and if $SD_{ST}$ is constant according to the following equation: then the CFD is stable.

$$\frac{SD_{St}}{Avg_{St}} \leq H_{St}$$

where $Avg_{St}$ is the average of the past L stability scores; and $H_{St}$ is the stability threshold.

For example, if the certainty of the values for the attributes in a CFD fluctuates or a condition is removed from a CFD, then the entropy component of the stability score St will change significantly, which will prevent the CFD from becoming stable. Similarly, if the support for a CFD fluctuates, then St will fluctuate as well, which will prevent the CFD from becoming stable.

In one embodiment, CFinder uses the measures of support and conviction to filter weak CFDs (i.e. CFDs that do not meet and/or exceed the thresholds specified for these measures). Support measures how much evidence there is for a CFD, and can be defined using the consistent and irrelevant record counts. Conviction measures how much the antecedent and consequent of a CFD deviate from independence while considering directionality. This measure has been shown to be effective for filtering weak CFDs.

In addition to these measures, in one embodiment, CFinder applies an additional filter to remove subsumed CFDs. A CFD—i.e. $F_1$: $(X_1 \rightarrow Y_1, T_{p1})$—subsumes another CFD—i.e. $F_2$: $(X_2 \rightarrow Y_2, T_{p2})$—if $Y_1$ equals $Y_2$, $X_1 \subset X_2$, and $T_{p1} \subset T_{p2}$. If these conditions are met, then in one embodiment, CFinder removes the subsumed CFD (i.e. $F_2$) because it has less applicability.

In one embodiment, CFinder then generalizes the remaining CFDs to further increase their applicability. A CFD F1 can be generalized if there exists another CFD F2 such that F1 and F2 have the same antecedents and consequents—i.e. X1 equals X2 and Y1 equals Y2. The pattern tuples of F1 and F2 differ by a single value If these conditions are met, then, in one embodiment, CFinder generalizes F1 and F2 into a single CFD by replacing the differing value in their pattern tuples with a wildcard (i.e. '_') which can match any arbitrary value. For example, given the following CFDs:
(Rcpt Category, agency→Program,
(For Profits, ED∥Grants))
(Rcpt Category, Agency→Program,
(Higher ED, ED∥Grants))
In one embodiment, CFinder can generalize them into:
(Rcpt Category, Agency→Program, (ED,_∥Grants))

Embodiments of the invention as described above can significantly accelerate data quality efforts on enterprise initiatives ranging from master data management to business intelligence by significantly reducing the amount of manual effort required to identify and collect data quality rules. In addition, the fact that they can be integrated with key data quality vendor solutions assures that the data quality rules can quickly be made operational for these solutions. It is also important to note that they can effectively detect and validate data quality problems beyond addresses, names, null values, and value ranges.

Although embodiments of the invention have been discussed primarily with respect to specific embodiments thereof, other variations are possible. Various configurations of the described system may be used in place of, or in addition to, the configurations presented herein. For example, although the system was discussed as if its components were serially connected, the components could be linked by a separate data bus or through any number of other configurations. The invention is not limited to use with finite data sets but instead a constantly changing data set can be used to train the required rules. A set of rules can likewise be continuously updated while on-line. Functions may be performed by hardware or software, as desired. In general, any diagrams presented are only intended to indicate one possible configuration, and many variations are possible. Those skilled in the art will also appreciate that methods and systems consistent with the present invention are suitable for use in a wide range of applications encompassing any involving data management. While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims. Furthermore, those skilled in the art will appreciate that the foregoing description is by way of example only, and is not intended to limit the invention.

What is claimed is:

1. A computer-implemented method comprising:
generating a set of candidate conditional functional dependencies based on a set of candidate seeds by using an ontology of a data set, said data set comprising records comprising a plurality of attributes and a plurality of values for said attributes, said plurality of attributes comprising attributes having multiple and different values, wherein said ontology comprises links that indicate which of said attributes are related, said candidate seeds comprising instances of related attributes;
applying said candidate conditional functional dependencies individually to said data set to obtain a set of corresponding result values for said candidate conditional functional dependencies;
refining said candidate conditional functional dependencies individually, said refining comprising, for each of said conditional functional dependencies:
incrementing a first count of records in a first subset of said plurality of records that are consistent with a conditional functional dependency, wherein all values in a pattern tuple of said conditional functional dependency match respective values in a record that is consistent with said conditional functional dependency;
incrementing a second count of records in said first subset of said plurality of records that are inconsistent with said conditional functional dependency, wherein all values in a pattern tuple of the antecedent of said conditional functional dependency match respective values, but values in said pattern tuple of the consequent of said conditional functional dependency do not match respective values, in a record that is inconsistent with said conditional functional dependency;
incrementing a third count of records in said first subset of said plurality of records that are not consistent with said conditional functional dependency and are not inconsistent with said conditional functional dependency;
determining whether a first measure based on said first and third counts satisfies a first threshold value, wherein if said first measure fails to satisfy said first threshold value then a condition is removed from said antecedent of said conditional functional dependency and said refining then continues for a second subset of said plurality of records; and
determining whether a second measure based on said second and third counts satisfies a second threshold value, wherein if said second measure fails to satisfy said second threshold value then said first measure is reduced and said refining then continues for said second subset of said plurality of records;

terminating said applying and said refining when said candidate conditional functional dependencies individually reach a quiescent state; and selecting a relevant set of said candidate conditional functional dependencies to be used as data quality rules for said data set.

2. The computer-implemented method from claim 1, wherein:

a first number of conditions in each of said candidate conditional functional dependencies can be adjusted by a user prior to generating said set of candidate conditional functional dependencies; and a second number of attributes in a candidate seed of said set of candidate seeds can be adjusted by a user prior to generating said set of candidate seeds.

3. The computer-implemented method from claim 1, wherein:

said set of candidate conditional functional dependencies has a predetermined number of said candidate conditional functional dependencies; and said predetermined number of conditional functional dependencies can be adjusted by a user.

4. The computer-implemented method from claim 1, wherein said candidate conditional functional dependencies in said relevant set have a corresponding set of combined result signatures that have the best goodness of fit in terms of a maximum degree of coverage of said data set and a minimum proximity between a detected error rate and said predetermined error estimate.

5. The computer-implemented method from claim 4, further comprising:

ranking said candidate conditional functional dependencies in said relevant set according to an interestingness factor; wherein said interestingness factor increases for a particular one of said candidate conditional functional dependencies as a portion of said data set consisting of a data value on which said particular one of said candidate conditional functional dependencies is based on decreases.

6. The computer-implemented method from claim 1, wherein the size of a data segment of said data set that said candidate conditional functional dependencies are applied to during said applying is set by a predetermined scan period.

7. The computer-implemented method from claim 6, wherein said predetermined coverage estimate, said predetermined error estimate, and said predetermined scan period can be adjusted by a user.

8. The computer-implemented method from claim 1, wherein said quiescent state is achieved for a specific one of said candidate conditional functional dependencies when said specific one of said candidate conditional functional dependencies has been applied individually to a series of said data segments without said refining altering said specific candidate conditional functional dependencies, wherein said series of said data segments contain an amount of data points equal in size to a predetermined window period and contain stable data.

9. The computer-implemented method from claim 8, wherein said predetermined window period can be adjusted by a user.

10. The computer-implemented method from claim 1, wherein strength values are associated with said links, each of said links associated with a respective strength value, wherein said generating comprises:

computing an average strength value for each combination of related attributes; and discarding combinations of related attributes having an average strength value that fails to satisfy a threshold value.

11. The computer-implemented method from claim 1, wherein said refining further comprises identifying and eliminating a high entropy attribute from a subset of said plurality of attributes, said subset comprising multiple attributes and associated with a candidate conditional functional dependency, said high entropy attribute having the most different values relative to any of the other attributes in said subset of said plurality of attributes.

12. The computer-implemented method from claim 1, further comprising repeating said applying if said set of corresponding result values does not have a result signature that meets a predetermined expectation, wherein said predetermined expectation is set by a predetermined coverage estimate of a first portion of said data set that is covered by an individual one of said candidate conditional functional dependencies, and a predetermined error estimate of a second portion of said data set that will be erroneous.

13. A computer-implemented method comprising:

generating a set of candidate conditional functional dependencies based on a set of candidate seeds by using an ontology of a data set, said data set comprising a plurality of records comprising a plurality of attributes and a plurality of values for said attributes, said plurality of attributes comprising attributes having multiple and different values, wherein said ontology comprises links that indicate which of said attributes are related, each of said candidate seeds comprising instances of related attributes;

applying said candidate conditional functional dependencies individually to said data set to obtain a set of corresponding result values for each of said candidate conditional functional dependencies;

refining said candidate conditional functional dependencies individually, said refining comprising, for each of said conditional functional dependencies:

incrementing a first count of records in a first subset of said plurality of records that are consistent with a conditional functional dependency, wherein all values in a pattern tuple of said conditional functional dependency match respective values in a record that is consistent with said conditional functional dependency;

incrementing a second count of records in said first subset of said plurality of records that are inconsistent with said conditional functional dependency, wherein all values in a pattern tuple of the antecedent of said conditional functional dependency match respective values, but values in said pattern tuple of the consequent of said conditional functional dependency do not match respective values, in a record that is inconsistent with said conditional functional dependency;

incrementing a third count of records in said first subset of said plurality of records that are not consistent with said conditional functional dependency and are not inconsistent with said conditional functional dependency;

determining whether a first measure based on said first and third counts satisfies a first threshold value, wherein if said first measure fails to satisfy said first threshold value then a condition is removed from said antecedent of said conditional functional dependency and said refining then continues for a second subset of said plurality of records; and determining whether a second measure based on said second and third counts satisfies a second threshold value, wherein if said second measure fails to satisfy said second threshold value then said first measure is reduced and said refining then continues for said second subset of said plurality of records;

terminating said applying and said refining when said candidate conditional functional dependencies individually reach a quiescent state;

selecting a relevant set of said candidate conditional functional dependencies to be used as said data quality rules for said data set; and enhancing the data quality of said data set by checking the data of said data set against said relevant set and screening said data if said data does not follow a rule contained in said relevant set.

14. The computer-implemented method from claim 13, further comprising continuing to apply said relevant set to enhance the data quality of a group of additional data sets that are related in content to said data set.

15. The computer-implemented method from claim 13, further comprising exporting said relevant set to one of a data quality product and an external data base management system.

16. The computer-implemented method from claim 15, wherein said data quality product is one of TS Discovery, Informatica IDE/IDQ and Oracle Data Integrator.

17. The computer-implemented method from claim 13, wherein said refining further comprises identifying and eliminating a high entropy attribute from a subset of said plurality of attributes, said subset comprising multiple attributes and associated with a candidate conditional functional dependency, said high entropy attribute having the most different values relative to any of the other attributes in said subset of said plurality of attributes.

18. The computer-implemented method from claim 13, further comprising repeating said applying if said set of corresponding result values does not have a result signature that meets a predetermined expectation, wherein said predetermined expectation is set by a predetermined coverage estimate of a first portion of said data set that is covered by an individual one of said candidate conditional functional dependencies, and a predetermined error estimate of a second portion of said data set that will be erroneous.

19. A computer system comprising:

a rule repository operable for storing data quality rules;

a graphical user interface comprising a display window and capable of receiving a data set, said data set comprising a plurality of records comprising a plurality of attributes and a plurality of values for said attributes, said plurality of attributes comprising attributes having multiple values, an ontology comprising links that indicate which of said attributes are related, and a set of rule generation parameters;

a data quality rules discovery engine capable of receiving said data set, said ontology, and said set of rule generation parameters from said user interface, generating said set of data quality rules, and sending said set of data quality rules to said rule repository, wherein data quality rules generated by said data quality rules discovery engine are displayed in said display window;

wherein said data quality rules discovery engine formulates a set of candidate conditional functional dependencies based on a set of candidate seeds by using said ontology, said candidate seeds comprising instances of related attributes; and wherein said data quality rules discovery engine refines said set of candidate conditional functional dependencies by:

incrementing a first count of records in a first subset of said plurality of records that are consistent with a conditional functional dependency, wherein all values in a pattern tuple of said conditional functional dependency match respective values in a record that is consistent with said conditional functional dependency;

incrementing a second count of records in said first subset of said plurality of records that are inconsistent with said conditional functional dependency, wherein all values in a pattern tuple of the antecedent of said conditional functional dependency match respective values, but values in said pattern tuple of the consequent of said conditional functional dependency do not match respective values, in a record that is inconsistent with said conditional functional dependency;

incrementing a third count of records in said first subset of said plurality of records that are not consistent with said conditional functional dependency and are not inconsistent with said conditional functional dependency;

determining whether a first measure based on said first and third counts satisfies a first threshold value, wherein if said first measure fails to satisfy said first threshold value then a condition is removed from said antecedent of said conditional functional dependency and said refining then continues for a second subset of said plurality of records; and determining whether a second measure based on said second and third counts satisfies a second threshold value, wherein if said second measure fails to satisfy said second threshold value then said first measure is reduced and said refining then continues for said second subset of said plurality of records;

wherein said data quality rules discovery engine terminates refining of said set of candidate conditional functional dependencies when said set of conditional functional dependencies reaches a quiescent state and becomes said data quality rules.

20. The computer system from claim 19, said graphical user interface further capable of displaying and receiving said rule generation parameters, an address of said data set, an address of a related data set, and an address of said ontology, and said set of data quality rules; and wherein said rule generation parameters can be adjusted by the user through said graphical user interface.

21. The computer system from claim 19, further comprising a data exchanger plug-in capable of exporting a relevant set of said data quality rules to one of a data quality product and an external data base management system.

22. The computer system from claim 19, wherein said data quality rules discovery engine also refines said candidate conditional functional dependencies iteratively if they do not meet a predetermined expectation when applied to said data set, wherein said predetermined expectation is set by a predetermined coverage estimate of a first portion of said data set that is covered by an individual one of said candidate conditional functional dependencies and by a predetermined error estimate of a second portion of said data set that will be erroneous.

23. The computer system from claim 19, wherein said data quality rules discovery engine also refines said candidate conditional functional dependencies by identifying and eliminating a high entropy attribute from a subset of said plurality of attributes, said subset comprising multiple attributes and associated with a candidate conditional functional dependency, said high entropy attribute having the most different values relative to any of the other attributes in said subset of said plurality of attributes.

* * * * *

UNITED STATES PATENT AND TRADEMARK OFFICE
CERTIFICATE OF CORRECTION

| | | |
|---|---|---|
| PATENT NO. | : 8,700,577 B2 | Page 1 of 1 |
| APPLICATION NO. | : 12/779830 | |
| DATED | : April 15, 2014 | |
| INVENTOR(S) | : Yeh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this
Fourteenth Day of July, 2015

Michelle K. Lee
*Director of the United States Patent and Trademark Office*